US006901700B2

(12) United States Patent
Trabka

(10) Patent No.: US 6,901,700 B2
(45) Date of Patent: Jun. 7, 2005

(54) COMBINATION PLANTER

(76) Inventor: Grzegorz Trabka, 3003 Trappers Cove, Apt. 3B, Lansing, MI (US) 48910

( * ) Notice: Subject to any disclaimer, the term of this patent is extended or adjusted under 35 U.S.C. 154(b) by 0 days.

(21) Appl. No.: 10/639,099

(22) Filed: Aug. 12, 2003

(65) Prior Publication Data

US 2004/0031194 A1 Feb. 19, 2004

Related U.S. Application Data

(60) Provisional application No. 60/403,222, filed on Aug. 13, 2002.

(51) Int. Cl.[7] ............................................... A01G 9/02
(52) U.S. Cl. ........................................................ 47/86
(58) Field of Search ................................ 47/86, 87, 83, 47/39, 65.5, 67, 68, 66.7, 82; 206/423; 248/27.8

(56) References Cited

U.S. PATENT DOCUMENTS

| | | | |
|---|---|---|---|
| 152,758 A | * | 7/1874 | Mills ............................... 47/86 |
| 695,484 A | | 3/1902 | Parker |
| 1,989,403 A | * | 1/1935 | Dauernheim .................... 47/39 |
| 3,784,044 A | | 1/1974 | Bruggeman et al. |
| 3,987,585 A | | 10/1976 | Greenbaum |
| 4,592,166 A | * | 6/1986 | Tendrup et al. ................ 47/67 |
| 4,803,806 A | | 2/1989 | Ito |
| 5,094,060 A | | 3/1992 | Caird |
| 5,309,671 A | * | 5/1994 | Byun .............................. 47/83 |
| 5,501,040 A | | 3/1996 | White-Wexler et al. |
| 5,953,859 A | | 9/1999 | Cochran et al. |
| 6,134,834 A | | 10/2000 | Ripley, Sr. et al. |
| 2004/0031194 A1 | * | 2/2004 | Trabka ....................... 47/65.5 |

FOREIGN PATENT DOCUMENTS

| | | | | |
|---|---|---|---|---|
| JP | 6-209838 | * | 8/1994 | ............ A47G/7/08 |
| JP | 8-172919 | * | 7/1996 | ............ A01G/9/02 |
| JP | 10075664 A | * | 3/1998 | ............ A01G/9/02 |
| JP | 10098962 A | * | 4/1998 | ........... A01G/31/00 |

* cited by examiner

Primary Examiner—Jeffrey L. Gellner
(74) Attorney, Agent, or Firm—Mary M. Moyne; Ian C. McLeod

(57) ABSTRACT

A combination pot includes an outer pot, one (1) or more inner pots and a support frame to support the inner pots in the outer pot. The support frame has a main frame structure and one (1) or more basket supports. The basket supports are connected to the main frame structure and extend downward into the interior of the outer pot. The size and shape of the basket supports are similar to the size and shape of the inner pots. To create the combination pot, filler soil is partially filled into the interior of the outer pot. The support frame is then positioned in the outer pot. The remainder of the filler soil is filled in around the support frame. Next, filler plants are planted in the filler soil. Finally, the inner pots having plant soil and decorative plants are inserted into the basket supports.

3 Claims, 7 Drawing Sheets

COMBINATION PLANTER

CROSS-REFERENCE TO RELATED APPLICATIONS

This application claims the benefit of U.S. Provisional Application Ser. No. 60/403,222, filed Aug. 13, 2002.

STATEMENT REGARDING FEDERALLY SPONSORED RESEARCH OR DEVELOPMENT

Not Applicable

BACKGROUND OF THE INVENTION

1. Field of the Invention

The present invention relates to a combination planter which allows for easy and quick mixing and changing of plants in a pot. In particular, the present invention relates to a combination planter which includes a support frame for smaller inner pots which fits inside a larger outer pot.

2. Description of the Related Art

The related art has shown various planting devices which enable holding multiple plants in a single area. Pots or planters having a variety of different plants also known as combination pots have gained tremendous popularity in recent years due to the large number of new plant species available on the market. However, in the past, it has been difficult to create a combination pot in which the plants were easily interchangeable such that the plant makeup or mixture could be easily changed to satisfy all customers.

U.S. Pat. No. 3,784,044 to Bruggeman et al; U.S. Pat. No. 4,803,806 to Ito; U.S. Pat. No. 5,094,060 to Caird and U.S. Pat. No. 5,953,859 to Cochran et al. illustrate different devices which hold multiple plant pots for display, transport or storage.

In particular, Bruggeman et al shows the use of wire boxes to hold plant pots for transportation and storage of flower pots with plants.

In addition, Ito describes an ornamental flower bed base assembly. The assembly includes a base plate having a plurality of circular openings having flower plant holders with flower plants. The flower plant holders are removably mounted in the circular openings. This invention is used to create multi level flower beds.

Further, Caird describes an insert which allows a plurality of plant pots to be packed in a basket for transport and display in a uniform arrangement. The insert includes a basket having at least one (1) cavity for receiving a pot. The cavities can be of uniform or non-uniform size and depth. The insert can also have a flange which extends from a periphery of the cavities and contacts a portion of the basket to stabilize the insert in the basket. The flange also helps to prevent dirt and water from dripping into and damaging the basket.

Further still, Cochran et al describes an apparatus for holding trays having plants. The receptacle body has at least one (1) cavity for receiving the storage tray having the plants. The receptacle body can be embedded in the ground.

Also, of interest are U.S. Pat. No. 5,501,040 to White-Wexler et al and U.S. Pat. No. 6,134,834 to Ripley, Sr., et al which show different planters having individual compartments which allow for different and diverse planting environments.

Only of minimal interest are U.S. Pat. No. 3,987,585 to Greenbaum and U.S. Pat. No. 695,484 to Parker. Greenbaum describes a modular device which has multiple plant growth channels. Parker describes a means for growing and transplanting plants which uses a plant holder placed in the ground or in a bed. Soil is filled around and within the holder so as to form a continuous planting surface or bed on which seed may be scattered. The plant holder may be removed from the ground or bed with one (1) or more plants firmly rooted therein without disturbing other plants growing adjacent thereto.

There remains the need for a combination planter which has an outer pot having soil and plants and which has a support frame in the outer pot which enables the quick and easy insertion and removal of inner pots having plants from the outer pot.

SUMMARY OF THE INVENTION

A combination pot or planter which enables the use of permanent filler plants in combination with seasonal plants. The combination pot enables quick and easy replacement of the seasonal plants without disturbing the filler plants. The combination pot includes an outer pot, one (1) or more inner pots and a support frame to support the inner pots in the outer pot. The support frame has a main frame structure and one (1) or more basket supports. The size of the main frame structure is such that the main frame structure can be inserted into the open top of the outer pot and is supported by the sidewall of the outer pot spaced above the bottom of the outer pot. The main frame structure can be a loop of wire provided with a gap which allows the outer perimeter size of the main frame structure to be decreased in order to secure the support frame in the outer pot. The main frame structure can be resilient so that the main frame structure will attempt to resume its original shape and size once the support frame is correctly positioned in the outer pot. The resilient nature of the main frame structure allows for a tight fit of the support frame in the outer pot. The basket supports are connected to the main frame structure and extend downward into the interior of the outer pot. The basket supports have a top brace and a basket portion. The top brace has an opening which allows access to the interior of the basket support formed by the basket portion. In one (1) embodiment, the basket portion is formed by wires. The basket portion of the basket support can be constructed of wide bands having only a small space therebetween which helps to prevent the filler soil from entering the interior of the basket supports. The basket portions are constructed so that moisture and other liquids can easily pass between the interior of the outer pot and the interior of the basket support. The size and shape of the basket support is similar to the size of the inner pots. The inner pots perimeter size is slightly smaller than the size of the interior of the basket support so that the inner pots can be quickly and easily inserted into and removed from the basket supports. In one (1) embodiment the height of the inner pots is greater than a depth of the basket supports so that when the bottoms of the inner pots are adjacent and in contact with the bottoms of the basket support, the tops of the inner pots extend above the top braces of the basket supports. To use the combination pot, filler soil is first filled into the interior of the outer pot. The interior is only partially filled so that when the support frame is positioned in the outer pot, the bottoms of the basket supports are adjacent and in contact with the top of the filler soil. Once the support frame is securely positioned in the outer pot, the remainder of the filler soil is filled in around the support frame. The filler soil is filled in so that the filler soil does not enter the interior of the basket support. Next, filler plants are planted in the filler soil. Finally, the inner pots having plant soil and decorative plants are inserted into the basket supports. The inner pots can be easily exchanged and removed to change the look of the combination pot or to replace a damaged or dying decorative plant.

The present invention relates to a support frame for supporting an inner pot in an outer pot, which comprises: a main frame structure configured to fit within an interior of the outer pot; and a basket support connected to the main frame structure so that the basket support extends into the interior of the outer pot, the basket support being configured to support the inner pot.

Further, the present invention relates to a combination planter which comprises: an outer pot having an interior containing filler soil and filler plants; a support frame positioned in the outer pot and having a basket support extending into the filler soil in the outer pot; and an inner pot positioned in the basket support of the support frame, the inner pot having an interior containing plant soil and a decorative plant.

Still further, the present invention relates to a method for constructing a combination planter, which comprises the steps of: providing an outer pot having an interior; providing a support frame having a basket support with an interior, the support frame being configured to be positioned in the outer pot; (c) providing an inner pot having plant soil and decorative plants; (d) providing filler soil and filler plants; partially filling the outer pot with filler soil; positioning the support frame in the outer pot such that a top of the support frame is adjacent a top of the outer pot and so that the basket support extends into the interior of the outer pot; inserting filler soil into the interior of the outer pot around the support frame such that the filler soil does not enter into the interior of the basket support of the support frame; planting the filler plants in the filler soil in the interior of the outer pot; and (i)inserting the inner pot into the basket support of the support frame.

The substance and advantages of the present invention will become increasingly apparent by reference to the following drawings and the description.

BRIEF DESCRIPTION OF THE PREFERRED EMBODIMENTS

Figure 4:
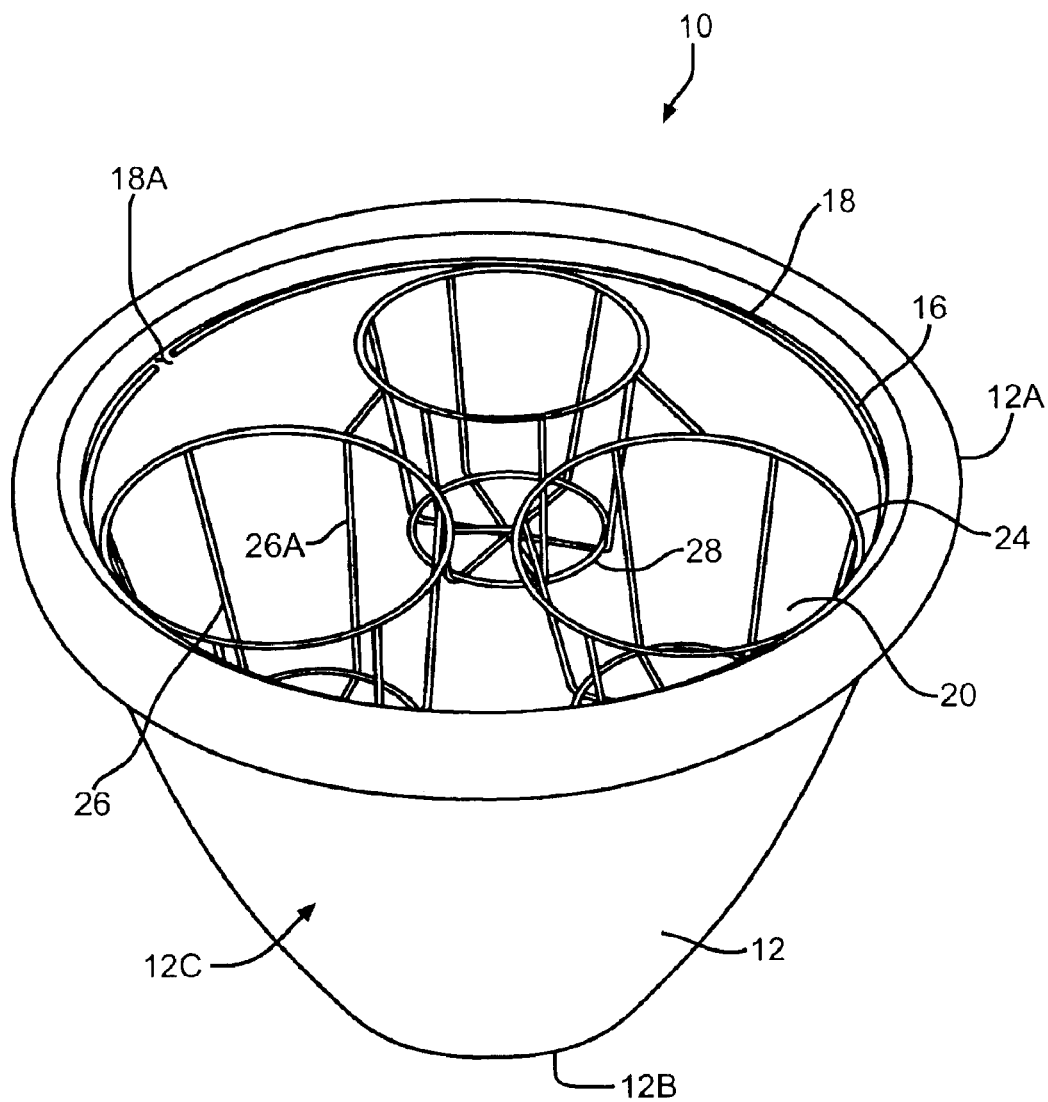
FIG. 4 is a perspective view of the combination planter 10 showing the support frame 16 and the outer pot 12.
Figure 5:
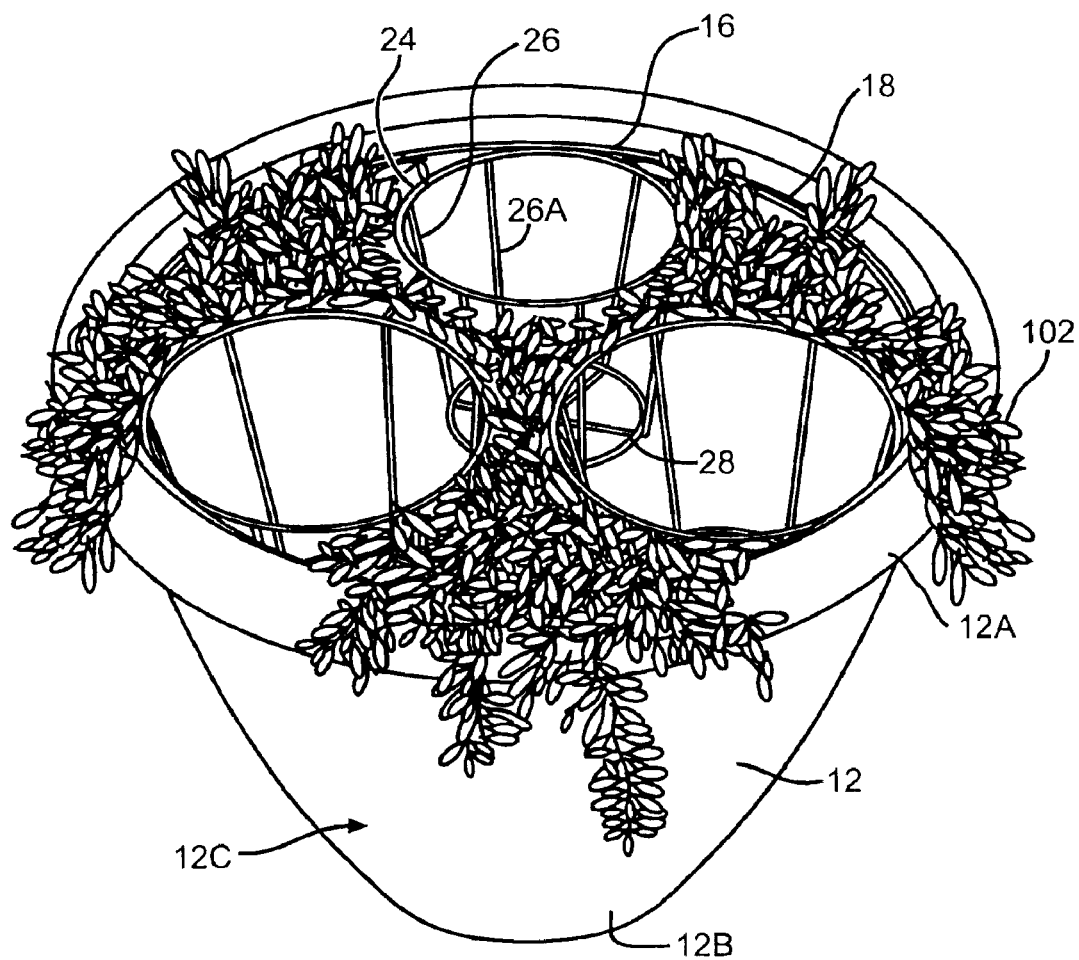
FIG. 5 is a perspective view of the combination planter 10 showing filler plants 102 in the outer pot 12 and the support frame 16 and basket supports 20 without the inner pots 22.

The combination planter or pot 10 of the present invention allows different varieties of plants having different planting times and soil requirements to be planted together in a single pot. The combination planter 10 allows users to mix and match plants to create their own combination. The combination planter 10 of the present invention includes a larger outer pot 12 and a support frame 16 which supports smaller inner pots 22 in the interior 12D of the outer pot 12 (FIG. 4). The outer pot 12 is similar to large garden pots well known in the art. The outer pot 12 could also be a basket. In one (1) embodiment, the outer pot 12 has a truncated triangular shape with an open top 12A and an essentially closed bottom 12B with a sidewall 12C extending therebetween forming the interior 12D of the outer pot 12. The bottom 12B of the outer pot 12 may have a small opening or openings (not shown) to allow excess moisture to escape from the outer pot 12. The open top 12A of the outer pot 12 in one (1) embodiment has a circular cross-section. However, it is understood that the open top 12A of the outer pot 12 could be of any shape.

Figure 1:
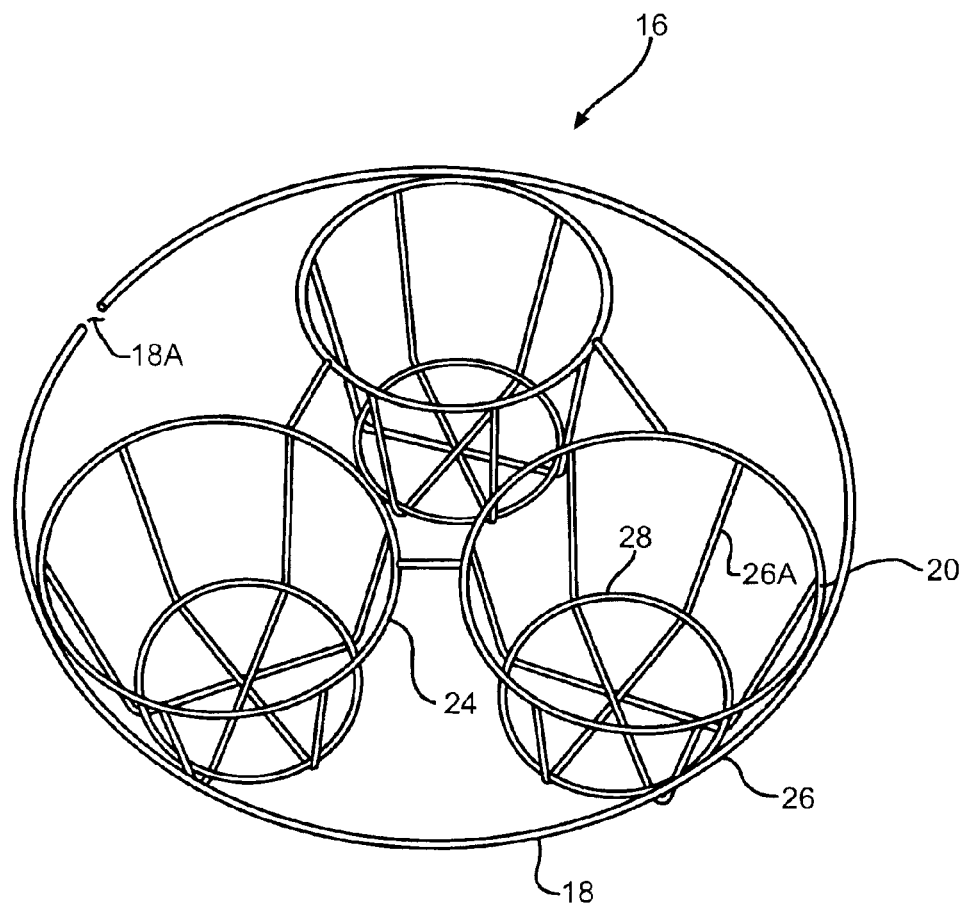
FIG. 1 is a top perspective view of the support frame 16 showing the basket supports 20.
Figure 2:
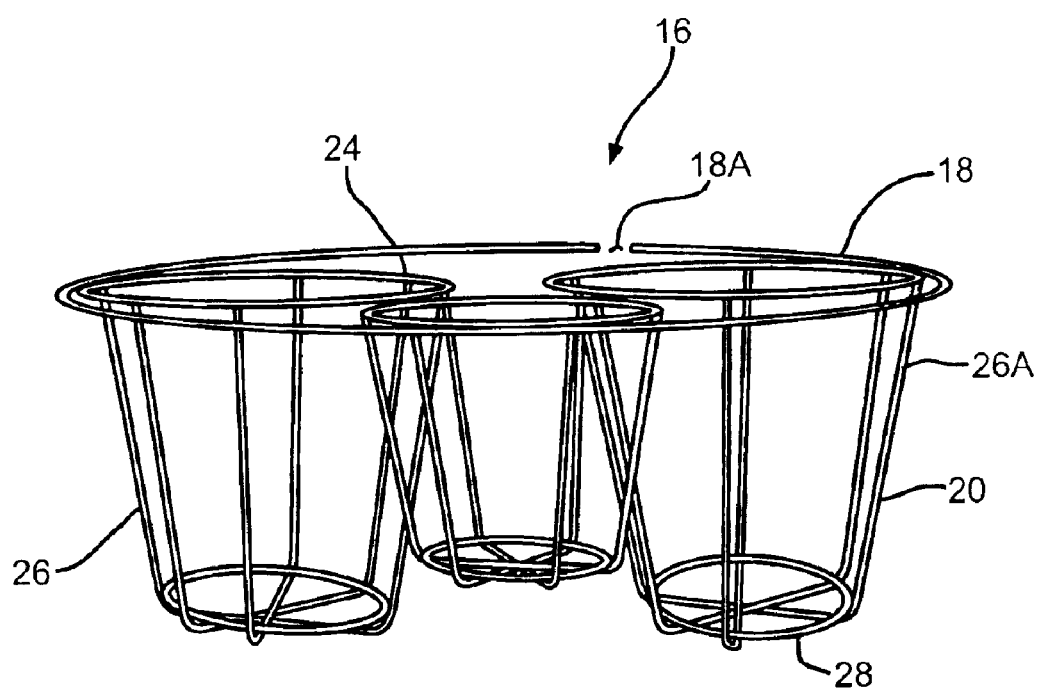
FIG. 2 is a side view of the support frame 16.
Figure 3:
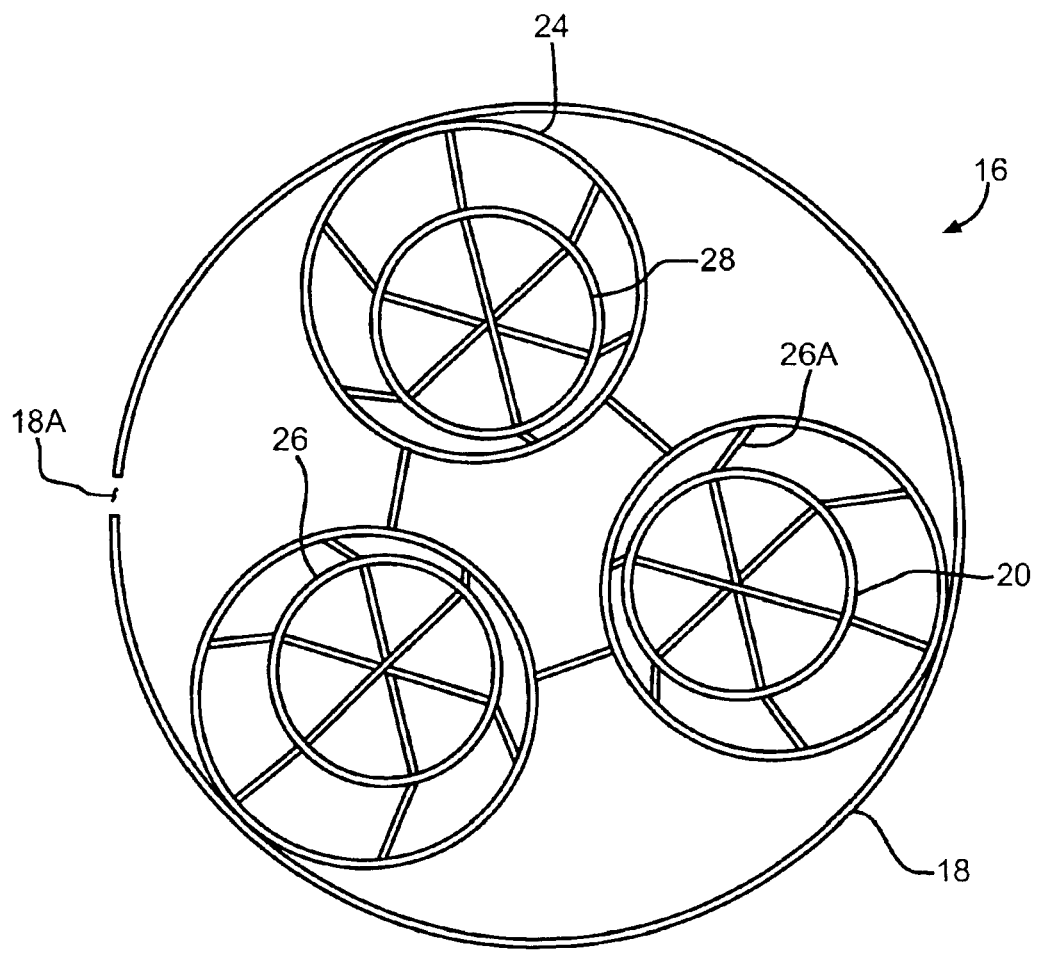
FIG. 3 is a top view of the support frame 16.

The support frame 16 of the present invention includes a main frame structure 18 and one (1) or more basket or pot supports 20 (FIGS. 1 to 3). The support frame 16 can be of any size such as to fit in the interior 12D of any size outer pot 12. In one (1) embodiment, the main frame structure 18 has a shape similar to the cross-sectional shape of the outer pot 12 adjacent the open top 12A of the outer pot 12 (FIG. 4). In one (1) embodiment, the main frame structure 18 has a circular shape. It is understood that the main frame structure 18 could have a variety of different shapes such as rectangular, oval, etc. The outer diameter or outer size of the main frame structure 18 is essentially equal to the inner diameter or inner size of the sidewall 12C of the outer pot 12 adjacent the open top 12A of the outer pot 12. However, it is understood that the diameter or perimeter size of the support frame 16 can be of any size and can be positioned within the interior 12D of the outer pot 12 anywhere along the sidewall 12C of the outer pot 12 between the open top 12A and the bottom 12B of the outer pot 12. In one (1) embodiment, the main frame structure 18 is provided with an adjustment gap 18A which allows the outer diameter or perimeter size of the main frame structure 18 to be decreased or increased to allow the main frame structure 18 to be inserted securely into the open top 12A of the outer pot 12 (FIG. 1). In one (1) embodiment, the main frame structure 18 is constructed of a material having memory such that after the main frame structure 18 is inserted into the open top 12A of the outer pot 12, the main frame structure 18 attempts to return to its original shape and size which helps to secure the main frame structure 18 in the interior 12D of the larger outer pot 12. In one (1) embodiment, the outer pot 12 has a ledge or shoulder (not shown) extending around the inner surface of the sidewall 12C of the outer pot 12 adjacent the open top 12A of the outer pot 12. The outer diameter or perimeter size of the main frame structure 18 is less than the diameter or size of the open top 12A of the outer pot 12, but greater than the inner diameter or size of the outer pot 12 at the ledge. In this embodiment, when the support frame 16 is inserted into the outer pot 12, the support frame 16 moves into the outer pot 12 until the main frame structure 18 contacts and rests on the ledge. In one (1) embodiment, the support frame 16 and the outer pot 12 are an integral piece.

Figure 7:
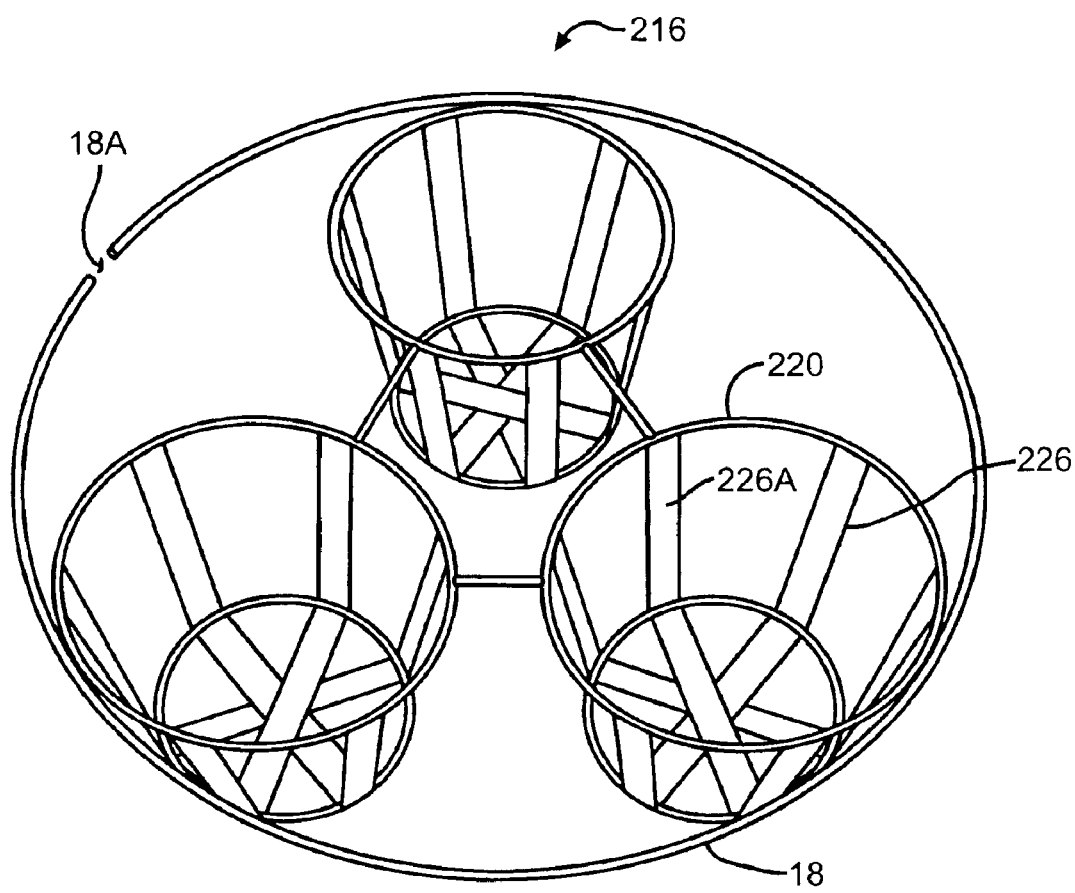
FIG. 7 is a perspective view of another embodiment of the support frame 216 showing the support basket 220 having bands 226A forming the basket portion 226.

The basket or pot supports 20 are provided within the main frame structure 18 and include a basket ring or top brace 24 and a basket portion 26. The support frame 16 can have one (1) or more basket supports 20. The top brace 24 has a perimeter size or diameter less than the perimeter size or diameter of the main frame structure 18. In one (1) embodiment, the top brace 24 is of a size such that three (3) inner basket supports 20 can be provided within the main frame structure 18. In one (1) embodiment, the basket supports 20 are spaced apart inside the inner area of the main frame structure 18. The top brace 24 of each basket support 20 is secured to the inner side of the main frame structure 18. Each of the top braces 24 can also be secured to each of the other top braces 24 in the main frame structure 18. In one (1) embodiment, the basket supports 20 are secured together by a center support ring (not shown). In one (1) embodiment, the basket portions 26 are secured to the main frame structure 18 so that the top braces 24 of the basket supports 20 extend above the main frame structure 18. In this embodiment, the main frame structure 18 may be positioned farther down in the outer pot 12 so that the top braces 24 are flush with the open top 12A of the outer pot 12. The basket portion 26 of the basket support 20 extends downward from the top brace 24 and forms the interior of the basket support 20. The top brace 24 has an opening to enable entry into the interior of the basket portion 26 of the basket support 20. In one (1) embodiment, the basket portion 26 is provided by wires 26A which have opposed ends and are connected at the opposed ends to opposite sides of the top brace 24. The wires 26A extend downward and across to form the bottom of the basket portion 26 (FIGS. 1 to 3). In another embodiment, the basket portion 226 is formed by bands 226A (FIG. 7). The bands 226A have a width so that almost all of the basket portion 226 is covered by the bands 226A. In one (1) embodiment, the basket portion 26 has a bottom support 28 which provides the outer perimeter shape for the bottom of the basket support 20. In the one (1) embodiment having the bottom support 28, the bands 226A or wires 26A are connected to the bottom support 28 which provides support for the bands 226A and wires 26A. The size and depth of the basket portion 26 depends on the size and depth of the inner baskets or pots 22. The basket portion 26 could also be provided by a plastic basket connected to the top brace 24, or any other well known material. The shape of the basket portion 26 can be round, square or any other well known shape.

The support frame 16 can be constructed of any durable material which is environmentally safe and will not degrade when exposed to the elements such as water and soil. In one (1) embodiment, the support frame 16 is constructed of metal. In another embodiment, the support frame 16 is constructed of plastic. The main frame structure 18 and the basket supports 20 can be constructed as a unitary piece or can be secured together to form the support frame 16.

The inner pots 22 have a size and shape similar to the size and shape of the basket portion 26 of the basket support 20. In one (1) embodiment, the inner pots 22 have a size slightly less than the size of the basket portion 26 so that the inner pots 22 can be easily removed and inserted into the basket portion 26 of the basket support 20. The inner pots 22 can be constructed of any well known material. However, it has been found that inner pots 22 constructed of recycled paper, fiber pot, paper mache or coco fiber allow for free moisture exchange between the filler soil 100 in the outer pot 12 and the plant soil 104 in the inner pot 22.

In one (1) embodiment, the outer pot 12 has an inner diameter of approximately 15 inches (38 cm) adjacent the open top 12A. The main frame structure 18 of the support frame 16 also has an outer diameter of approximately 15 inches (38 cm). The support frame 16 includes three (3) basket supports 20 with the top brace 24 having a diameter of approximately 6 inches (15 cm) and the basket portion 26 having a depth of approximately 5 inches (13 cm). The inner pots 22, in this embodiment, have an outer diameter at the top of approximately 5.5 inches (14 cm) and have a depth of approximately 5 inches (13 cm).

To use the combination pot 10 of the present invention, the outer pot 12 is filled with filler soil 100 to a point just below the bottom of the basket portion 26 of the basket support 20 when the support frame 16 is correctly positioned in the interior 12D of the outer pot 12. In one (1) embodiment, the basket support 20 is first removed from the outer pot 12 to allow for easier filling of the outer pot 12. Next, the basket support 20 is inserted into the top 12A of the outer pot 12 such that the basket portions 26 extend downward into the interior 12D of the outer pot 12. In one (1) embodiment, to insert the support frame 20 into the outer pot 12, the diameter or perimeter size of the main frame structure 18 is reduced by reducing the size of the adjustment gap 18A. The diameter or perimeter size of the main frame structure 18 is reduced until it is slightly less than the inner diameter or inner perimeter size of the sidewall 12C of the outer pot 12 at the open top 12A. In one (1) embodiment, once the support frame 16 is within the interior 12D of the outer pot 12 with the main frame structure 18 in contact with the inner surface of the sidewall 12C of the outer pot 12, the force of the main frame structure 18 attempting to regain its original size keeps the main frame structure 18 in position using a force fit. In one (1) embodiment, the diameter of the main frame structure 18 is decreased by forcing the support frame 16 into the open top 12A of the outer basket or pot 12. In another embodiment, where the inner surface of the outer pot 12 has a ledge, the support frame 16 is inserted into the outer pot 12 until the main frame structure 18 rests on the ledge.

Once the support frame 16 is positioned in the outer basket or pot 12, the remaining filler soil 100 is filled into the interior 12D of the outer pot 12 around the support frame 16. The filler soil 100 is filled in until only the top of the basket supports 20 remain uncovered and the interior of the basket supports 20 remain free from filler soil 100. In one (1) embodiment, the filler soil 100 does not extend over the top braces 24 of the basket supports 20. In another embodiment, the filler soil 100 covers the top braces 24 of the basket supports 20 as well as the main frame structure 18 of the support frame 16. The wires 26A or bands 226A of the basket portion 26 or 226 of the basket support 20 prevent the filler soil 100 in the outer pot 12 from collapsing into the interior of the basket portion 26. In one (1) embodiment where the basket portion 26 of the basket supports 20 are formed by bands 226A, the small spacing between the bands 226A forms a barrier and helps prevent the filler soil 100 from entering the interior of the basket supports 20. However, the wires 26A or bands 226A are spaced apart so that the basket portion 26 is porous so that water and liquid nutrients can pass between the interior 12D of the outer pot 12 and the interior of the inner pot 22. Next, filler plants 102 are planted in the filler soil 100 around the basket supports 20. The level of the filler soil 100 may be lower within the outer pot 12 depending on the height and density of the filler plants 102. It is understood that the type of filler soil 100 filled into the outer pot 12 depends on the type of filler plants 102 planted in the outer pot 12. The filler plants 102 can be of any type. In addition, more than one (1) type of filler plant 102 can be used. Next, individual inner pots 22 having decorative, seasonal or other plants 106 are inserted into the basket portion 26 of the basket support 20. In one (1) embodiment, the basket support 20 is positioned in the outer pot 12 such that the tops 22A of the inner pots 22 are essentially flush with the top 12A of the outer pot 12 when the bottoms 22B of the inner pots 22 are in contact with the bottoms of the basket support 20. In one (1) embodiment, the height of the inner pots 22 is greater than a depth of the basket portion 26 of the basket support 20 so that when the bottom of the inner pots 22 are in contact with the bottom of the basket portion 26 of the basket support 20, the tops 22A of the inner pots 22 extend beyond the top brace 24 of the basket support 20.

Figure 6:
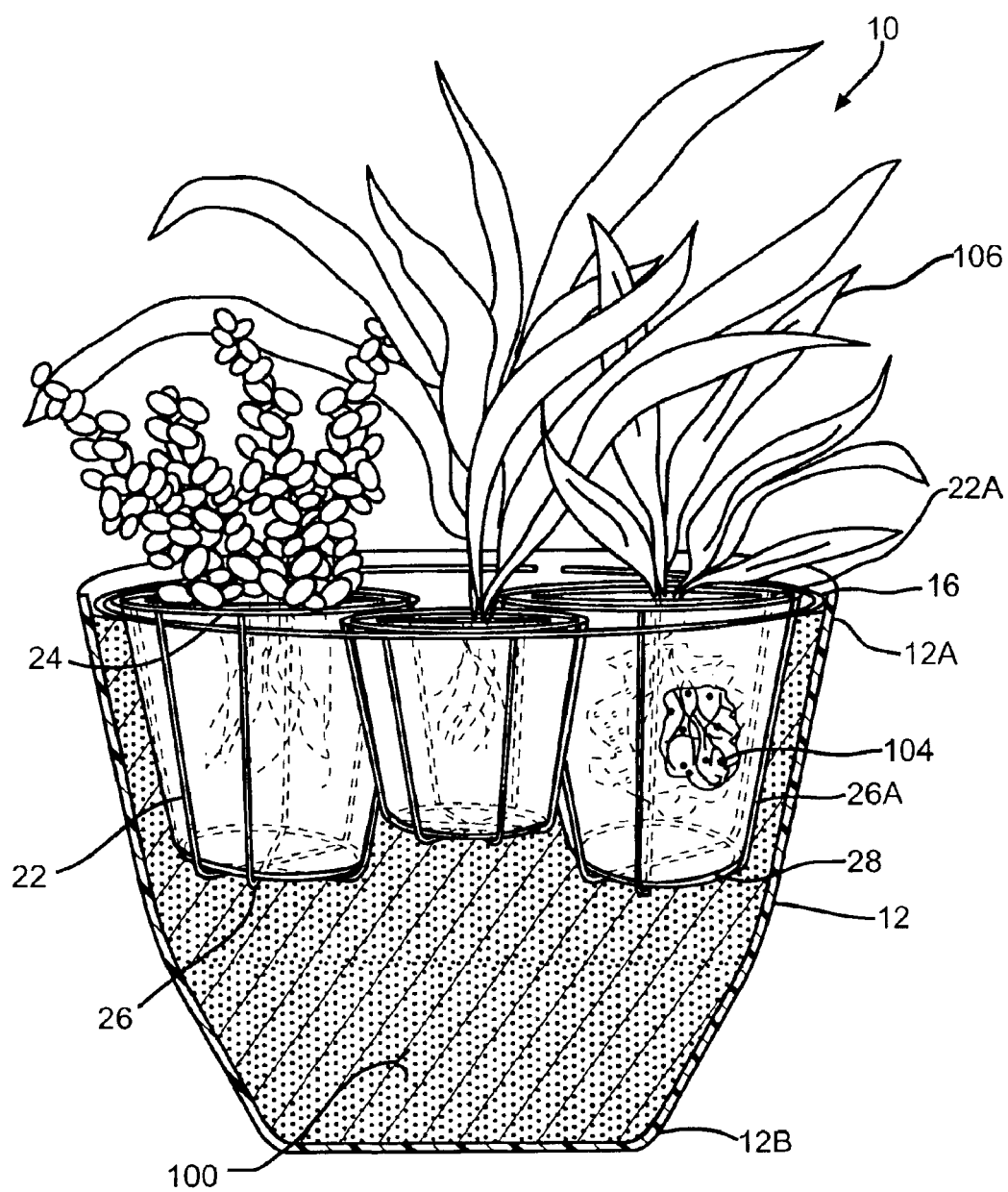
FIG. 6 is a cross-sectional view of the combination planter 10 showing the filler soil 100 without the filler plants 102 in the outer pot 10 and decorative plants 106 in the inner pots 22 in the support frame 16 with a cutaway showing the plant soil 104.

It is understood that the plant soil 104 in the inner pots 22 is separate from and can be the same or different from the filler soil 100 in the outer pot 12 (FIG. 6). The type of plant soil 104 in the inner pots 22 depends on the type of decorative plants 106 planted in the inner pots 22. The individual decorative plants 106 can be of any type. Each inner pot 22 can have the same or different plants 106 and thus, can have the same or different plant soil 104. In one (1) embodiment, each separate inner pot 22 contains one (1) type of plant 106. In one (1) embodiment, the filler plants 102 are accent plants while the decorative plants 106 are flowering or foliage plants. To remove an individual decorative plant 106, the user removes the inner pot or basket 22 having that plant 106. Another inner pot 22 can then be easily inserted into the basket support 20. The use of individual, separate inner pots 22 allows for easy exchange of decorative plants 106 within the combination pot 10.

The separate inner pots 22 allow for separate root systems for the filler plants 102 and the decorative plants 106. The separate root systems allow users to exchange decorative plants 106 throughout the seasons. By separating the different types of plants 102 and 106, the present invention utilizes the longevity and versatility of the filler plants 102 while taking advantage of the variety of seasonal flowering and foliage plants 106. The present invention allows for dramatically changing the look and functionality of the combination planter 10 by replacing or exchanging the inner pots 22 containing the decorative plants 106 without removing the filler soil 100 or the filler plants 102 in the outer pot 12.

It is intended that the foregoing description be only illustrative of the present invention and that the present invention be limited only by the hereinafter appended claims.

I claim:

1. A method for constructing a combination planter, which comprises the steps of:

(a) providing an outer pot having an open top and an opposed bottom with an interior spaced therebetween;

(b) providing a support frame having a basket support with a top and a basket portion having an interior, the support frame being configured to be positioned in the outer pot;

(c) providing an inner pot having plant soil and decorative plants;

(d) providing filler soil and filler plants;

(e) partially filling the interior of the outer pot with filler soil;

(f) positioning the support frame in the interior of the outer pot such that the top of the support frame is adjacent the top of the outer pot and so that the basket portion of the basket support extends into the interior of the outer pot in a direction toward the bottom of the outer pot;

(g) inserting filler soil into the interior of the cuter pot around the support frame and the basket support such that the filler soil does not enter into the interior of the basket portion of the basket support of the support frame;

(h) planting the filler plants in the filler soil in the interior of the outer pot; and (I) inserting the inner pot into the interior of the basket portion of the basket support of the support frame so that the inner pot does not extend beyond the top of the outer pot in a direction opposite the bottom of the outer pot.

2. The method of claim 1 wherein a second inner pot having a second decorative plant is provided and wherein after step (I), the inner pot is removed from the interior of the basket portion of the basket support of the support frame and the second inner pot is inserted into the interior of the basket portion of the basket support.

3. The method of claim 1 wherein the support frame has a main frame structure connected to the basket support and wherein further in step (g), the filler soil is inserted into the interior of the outer pot until the filler soil is flush with the main frame structure of the support frame.

* * * * *